H. W. YERINGTON.

Assignor to R. C. ANTHONY.

WIRE-FASTENINGS FOR BOTTLE-STOPPERS.

No. 7,501. Reissued Feb. 6, 1877.

Witnesses:
Samuel Lea
Theodore Cotts

Inventor:
Henry W. Yerington

N. PETERS, PHOTO-LITHOGRAPHER, WASHINGTON, D. C.

UNITED STATES PATENT OFFICE.

HENRY W. YERINGTON, OF OCEANIC, NEW JERSEY, ASSIGNOR TO ROWLAND C. ANTHONY, OF NEW YORK CITY.

IMPROVEMENT IN WIRE FASTENINGS FOR BOTTLE-STOPPERS.

Specification forming part of Letters Patent No. 162,451, dated April 20, 1875; reissue No. 7,501, dated February 6, 1877; application filed January 20, 1877.

*To all whom it may concern:*

Be it known that I, HENRY W. YERINGTON, of Oceanic, in the county of Monmouth and State of New Jersey, have invented certain new and useful Improvements in Wire-Fastenings for Bottle-Stoppers, of which the following is a specification:

My invention consists, first, in bending a single piece of wire at the middle nearly into the form of the letter U, then bending two loops or coils forming eyes on one side of the plane of the U part, at the extremities of its sides, connecting it with two arms, which extend from the loops on the opposite side of the plane of the U part, and at an angle with it, and are bent near their ends about at right angles into wrists or pins, upon which my improved wire form turns, when applied to bottle-stoppers. When this wire form is intended to rest at the middle part upon the top of the cork or stopper, I not only construct it with two rectangular inward wrists or pins, but with two other short square bends, extending from the ends of the wrists or pins in the direction of the bow of the middle part, and about parallel to the plane thereof. Secondly, my invention consists in an improved form of neck-band for bottle-stopper fastenings, which is made of a piece of wire bent in such manner as that when applied to the neck of a bottle, the middle portion, which is nearly of the form of the letter U, fits around the rear side of the neck and two loops or eyes and curved bends are formed between the U part and the ends, and opposite to each other, of such construction as that the carved bends are between the middle U part and the loops.

My invention consists also of the improved combination of a wire form, containing the loops, U part, arms, and pins first above mentioned, with a wire neck-band constructed with two loops opposite to each other, in which the wrists or pins of said wire form fit and turn. And it consists further of an improved combination for bottle-stopper fastenings, composed of a wire neck-band constructed with middle U part, two loops and curved bends, in combination with a bail-wire, constructed with inward rectangular pins, and with or without the parallel ends already mentioned.

Figure 1:
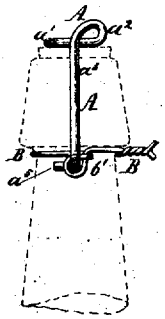
Figure 2:
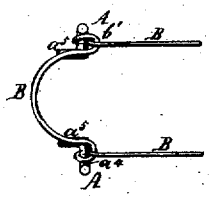
Figure 3:
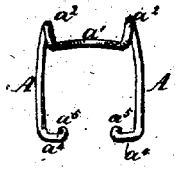
Figure 6:
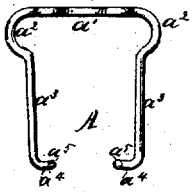
Figure 7:
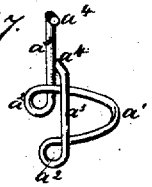

In the accompanying drawings, making part of this specification, Figure 1 represents a side view of a bottle neck and stopper, to which is applied one of my improved bottle-stopper fastenings. Fig. 2 shows a horizontal section of the same, taken just above the wrists and a plan view of my improved neck-wire. Fig. 3 represents a front view of the bail-wire shown in Fig. 1. Figs. 4, 5, 9, and 11, represent top views, and Figs. 6, 8, 10, and 12, front views, of the bail-wire of my improved bottle-stopper fastening, modified in respect to the form of the middle part or the intermediate loops, and Fig. 7 represents a side view of my improved wire form for bottle-stoppers.

The same letters indicate corresponding parts in the several figures.

Figure 4:
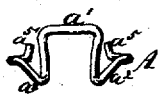
Figure 5:
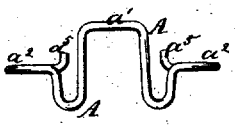
Figure 9:
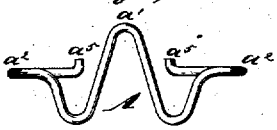
Figure 10:
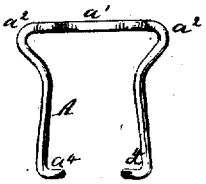
Figure 11:
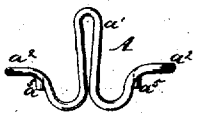
Figure 12:
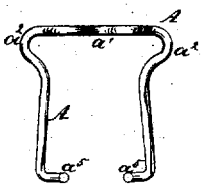

A represents the bail-wire of my improved bottle-stopper fastening, and B my improved neck-band. The middle portion of the bail-wire adapted to bear upon the top of the cork or stopper of the bottle, and to be adjusted in place while the plunger of the bottling-machine rests thereon, may be bent into a U form, of which the bow part is shown at $a^1$, as seen in Figs. 4 and 5, or into a V form as shown in Fig. 9, or into the reverse of said U form, with its sides pressed close together and the ends curved back again, as shown in Fig. 11. The last-mentioned form is adapted to a slot in the plunger of the bottling-machine, and allows the bow $a^1$ to pass into or through the slot.

Figure 8:
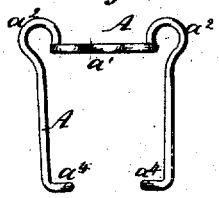

Upon the wire A at the ends of the sides of the U part are formed finger-loops. (Marked $a^2$ in the several figures.) These loops are made by bending the wires A so that their direction, when finished, is upward, rearward, outward, and downward, as shown in Figs. 1 and 3; or outward, rearward, outward, downward, inward, and downward, as shown in Figs. 5 and 6; or outward, rearward, upward, outward, downward, inward, and downward, as shown in Figs. 8 and 9; it being immaterial in what particular manner the said wires are bent, so long as finger-loops $a^2$ are formed standing out from the stopper, so as to be readily taken hold of with the fingers. These loops $a^2$ enable the wire A to be readily pushed aside with the fingers, thus releasing the stopper; and they also enable the fastening to be readily secured in position for holding the stopper in the bottle.

From the finger-loops $a^2$ the arms $a^3$ of the bail-wire A pass down to the eyes $b'$ of the neck-band B, where they are bent inward at right angles, or nearly so, as seen at $a^4$, thus forming the wrists or pins, which fit and turn in the said eyes, and the wires are then bent to the rearward at right angles, as shown at $a^5$.

The neck-wire B (shown in Figs. 1 and 2) is bent from a single piece of wire into a nearly U form at the middle, and into two curved bends and loops or eyes on opp site sides, as clearly shown in the drawing. The curved bends are formed between the U part and the loops, and the wires B pass through them.

By this construction of the loops $b'$, the rearwardly-projecting ends $a^5$ of the bail-wire A, when united with the neck-wire B, project beneath the body or bow of the neck-wire, near the loops thereof, and serve as stops to prevent the bail-wire from turning down forward at the front of the bottle, and thus insure its being always upon the proper side of the bottle relatively to the plunger of the bottling-machine when the bottle is placed in the machine to be filled.

My improved wire form for bottle-stoppers is represented in Fig. 7. The middle part is bent into a nearly U form, whereof the bow is shown at $a^1$, and the other end is open. At the extremities of the sides of the U part loops or coils, forming eyes, are bent, as seen at $a^2$, both of which are on the same side of the U part. The arms $a^3$ extend from the loops $a^2$ on the side of the U part opposite to the loops and at an angle with it, and terminate in wrists or pins $a^4$, forming the fulcrums thereof, bent inward toward each other at right angles, or nearly so, to the arms.

This improved wire form, with the addition of the bent ends $a^5$, is also represented in the bottle-stopper fastening shown in Figs. 1 and 2, combined with a neck-wire, securing it to the neck of the bottle by passing the pins $a^4$ through the loops $b'$ of the neck-wire, upon which they turn.

What I claim as new, and desire to secure by Letters Patent, is—

1. An improved wire form for bottle-stoppers, consisting of a single piece of wire bent at the middle into a nearly U form, two arms extending at an angle with the plane of the U part, and on one side of it, and two pins bent at right angles to the ends of the arms toward each other, in combination with two loops bent at the extremities of the sides of the U part on the opposite side of its plane to the arms, forming eyes, and connecting the U part with the arms, substantially as described.

2. An improved wire form for bottle-stoppers, bent from a single piece of wire into a nearly U form at the middle, with two loops, forming eyes, at the extremities of the sides of the U part, two arms extending from the loops at an angle with the U part on one side of it, and two rectangular pins at the ends of the arms, in combination with a wire collar, adapted to surround and be fastened to the neck of the bottle, and constructed with two loops or eyes on opposite sides, in which said pins fit and turn, substantially as described.

3. An improved wire form for bottle-stoppers constructed with a middle U part, in combination with two loops, and two curved bends between the loops and U part, substantially as described.

4. In combination with the loops $b'$, made on the under side of the neck-wire, the bends $a^5$ on the arms of the bail-wire, so that, while the bail is free to swing in one direction, the bent ends, coming against the neck-wire, prevent it from swinging in the other and wrong direction in relation to the plunger, substantially as described and represented.

HENRY W. YERINGTON.

Witnesses:

SAMUEL LEA,
THEODORE NYE.